United States Patent
Ogihara

(10) Patent No.: US 9,842,057 B2
(45) Date of Patent: Dec. 12, 2017

(54) STORAGE APPARATUS, STORAGE SYSTEM, AND DATA READ METHOD

(71) Applicant: FUJITSU LIMITED, Kawasaki-shi, Kanagawa (JP)

(72) Inventor: Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/941,113

(22) Filed: Nov. 13, 2015

(65) Prior Publication Data

US 2016/0196215 A1   Jul. 7, 2016

(30) Foreign Application Priority Data

Jan. 7, 2015  (JP) ................. 2015-001262

(51) Int. Cl.
| | | |
|---|---|---|
| *G06F 12/08* | (2016.01) | |
| *G06F 11/14* | (2006.01) | |
| *G06F 17/30* | (2006.01) | |
| *G06F 12/0893* | (2016.01) | |
| *G06F 3/06* | (2006.01) | |
| *G06F 12/0866* | (2016.01) | |
| *G06F 12/0868* | (2016.01) | |

(52) U.S. Cl.
CPC ............ *G06F 12/0893* (2013.01); *G06F 3/06* (2013.01); *G06F 11/14* (2013.01); *G06F 12/0866* (2013.01); *G06F 12/0868* (2013.01); *G06F 17/30156* (2013.01); *G06F 17/30194* (2013.01); *G06F 2212/60* (2013.01)

(58) Field of Classification Search
CPC ............ G06F 12/0866; G06F 12/0868; G06F 12/0893; G06F 11/14; G06F 17/30156; G06F 17/30194; G06F 2212/60
See application file for complete search history.

(56) References Cited

U.S. PATENT DOCUMENTS

| 6,928,526 B1 | 8/2005 | Zhu et al. |
|---|---|---|
| 2009/0254507 A1 | 10/2009 | Hosoya et al. |
| 2012/0166401 A1 | 6/2012 | Li et al. |

(Continued)

FOREIGN PATENT DOCUMENTS

| JP | 2009-251725 | 10/2009 |
|---|---|---|
| JP | 2012-141738 | 7/2012 |

OTHER PUBLICATIONS

European Search Report dated May 24, 2016 for corresponding European Patent Application No. 15195605.9, 8 pages.

*Primary Examiner* — Aracelis Ruiz

(74) *Attorney, Agent, or Firm* — Fujitsu Patent Center

(57) ABSTRACT

There is provided a storage apparatus connected to a storage device that stores data and a cache device used as a temporary storage area of the data. The storage apparatus includes: a memory configured to store location information for associating a storage location of data stored in the storage device with content information relating to content of the data, and cache information including the content information corresponding to data stored in the cache device; and a processor configured to identify, upon receiving a read request specifying the storage location and requesting to read data, the content information corresponding to the storage location specified in the read request and, when the content information is included in the cache information, read the data from the cache device and return the data as a response.

6 Claims, 19 Drawing Sheets

(56) References Cited

U.S. PATENT DOCUMENTS

2013/0268499 A1   10/2013  Kirihata et al.
2014/0095779 A1*  4/2014  Forsyth ................... G06F 12/00
                                                    711/105
2014/0317335 A1* 10/2014  Fukutomi ............. G06F 3/0685
                                                    711/103

* cited by examiner (CONTAINER INFORMATION 201a: FP TABLE)

| fp | CiD |
|----|-----|
| fpA | CiD1 |
| fpB | CiD2 |
| fpC | CiD3 |
| ⋮ | ⋮ |

FIG. 7

(BLOCK MAP 201b)

| LV | LBA | fp | CiD |
|---|---|---|---|
| LV#1 | LBA1 | fpA | CiD1 |
| | LBA2 | fpB | CiD2 |
| | LBA3 | fpC | CiD3 |
| | LBA4 | fpA | CiD1 |
| LV#2 | LBA1 | fpB | CiD2 |
| | LBA2 | fpC | CiD3 |

(RELATION WITH DATA CORRESPONDENCE)

EXEMPLARY VARIATION (BLOCK MAP 201b)

| LV | LBA | fp | CiD | SiD |
|---|---|---|---|---|
| LV#1 | LBA1 | fpA | CiD1 | SiD04 |
| | LBA2 | fpB | CiD2 | SiD11 |
| | LBA3 | fpC | CiD3 | SiD09 |
| | LBA4 | fpA | CiD1 | SiD04 |
| LV#2 | LBA1 | fpB | CiD2 | SiD11 |
| | LBA2 | fpC | CiD3 | SiD09 |

FIG. 19

STORAGE APPARATUS, STORAGE SYSTEM, AND DATA READ METHOD

CROSS-REFERENCE TO RELATED APPLICATION

This application is based upon and claims the benefit of priority of the prior Japanese Patent Application No. 2015-001262, filed on Jan. 7, 2015, the entire contents of which are incorporated herein by reference.

FIELD

The embodiments discussed herein relate to a storage apparatus.

BACKGROUND

There are widely used storage systems including a disk array having connected thereto a plurality of storage media such as HDDs (Hard Disk Drives) to provide redundancy using the RAID (Redundant Arrays of Inexpensive Disks) technique or the like, and a storage apparatus configured to control the disk array. The storage apparatus allocates a virtual storage area (virtual volume) to a storage area on a disk array (physical volume) and controls data read and write processes via the virtual volume.

The storage apparatus may divide a single virtual volume into a plurality of logical volumes and manage data in units of logical volume. In addition, the storage apparatus may set a logical data storage area (container) which is different from the logical volume and manage data using the container. Note that a container may be referred to as a chunk.

There exists a technique (deduplication) which, when the same data sets are redundantly stored in a plurality of storage areas in a storage system as described above, removes data sets redundantly stored in some of the storage areas to increase free space in the storage areas. Performing deduplication allows efficient use of the storage areas of the disk array.

Note that there is proposed, in a system configured to upload data to an online storage service, a technique that manages items to be uploaded in a plurality of configuration blocks and performs upload after excluding duplication of the configuration blocks. The system realizes duplication exclusion using a reference count indicating the degree of duplication of configuration blocks. In addition, there is proposed a technique that stores hash code-attached data in a logical volume, and detects redundant data by comparing the hash codes when performing deduplication.

See, for example, Japanese Laid-open Patent Publication Nos. 2012-141738 and 2009-251725.

The storage system may include a cache device configured to temporarily store data which has been read from the disk array by the storage apparatus in response to a data read request. The cache device has a higher data read speed than the disk array. Accordingly, the response time may be shortened when the storage apparatus successfully returns the data stored in the cache device in response to the data read request.

A data set to be read is identified by the storage apparatus based on a data storage location (address on a logical volume, or the like) specified in the read request. In other words, the storage apparatus distinguishes a plurality of data sets which is stored in different logical volumes but has the same content. Therefore, in a conventional storage apparatus, even when a data set having the same content as a data set to be read exists in the cache device, if storage locations of the two data sets are different, the data set is read from the disk array and returned.

In contrast, when there exists in the cache device a data set which has a storage location different from that of the data set specified in the read request but has the same content, if it is possible to read the data set from the cache device and return the data set, the opportunity of quick response to the read request may increase. As a result, an improved performance of the storage system may be expected.

SUMMARY

According to an aspect, there is provided a storage apparatus connected to a storage device that stores data and a cache device used as a temporary storage area of the data, the storage apparatus including: a memory configured to store location information for associating a storage location of data stored in the storage device with content information relating to content of the data, and cache information including the content information corresponding to data stored in the cache device; and a processor configured to identify, upon receiving a read request specifying the storage location and requesting to read data, the content information corresponding to the storage location specified in the read request and, when the content information is included in the cache information, read the data from the cache device and return the data as a response.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a third drawing for explaining container information according to the second embodiment;

FIG. 19 is an explanatory diagram of a block map according to an exemplary variation of the second embodiment.

DESCRIPTION OF EMBODIMENTS

Figure 1:
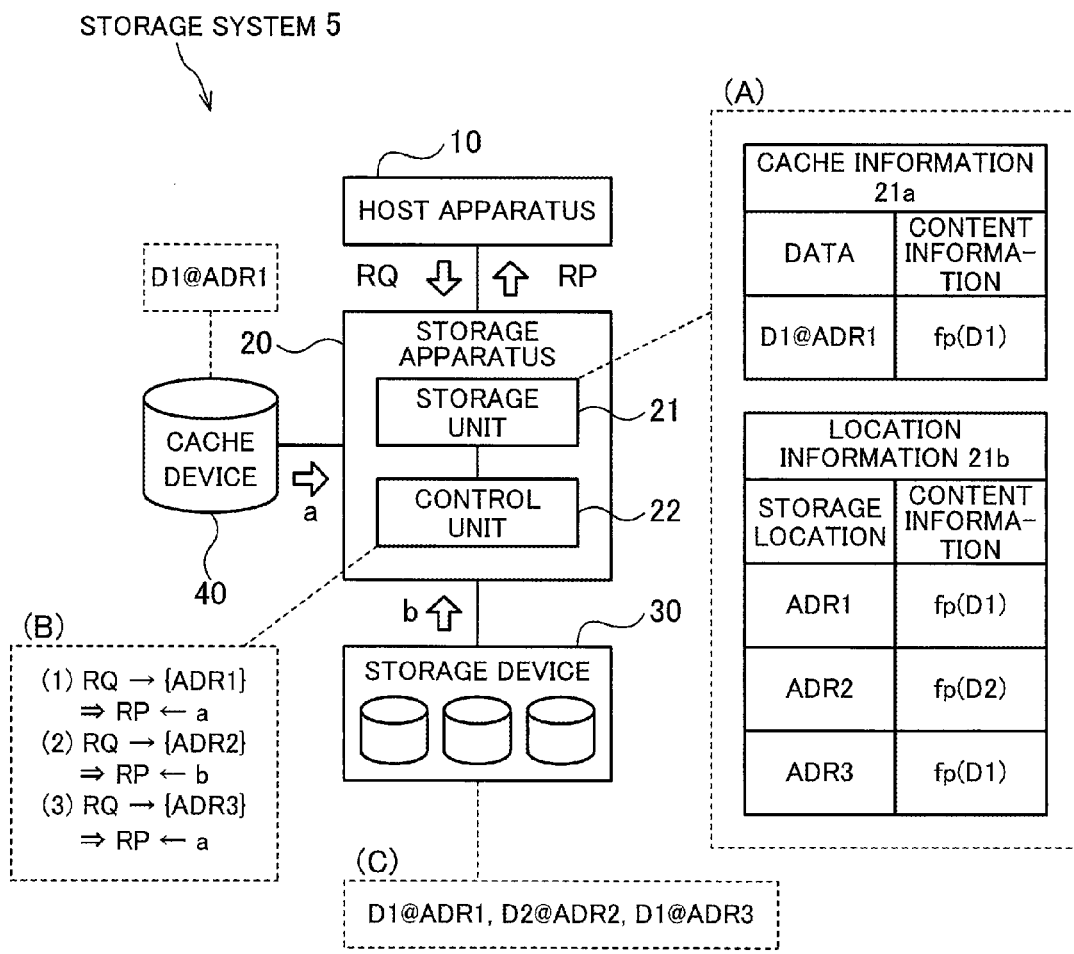
FIG. 1 illustrates an exemplary storage system according to a first embodiment.

Several embodiments will be described below with reference to the accompanying drawings, wherein like reference numerals refer to like elements throughout, with duplicate explanation being omitted.

1. First Embodiment

Referring to FIG. 1, a first embodiment will be described. FIG. 1 illustrates an exemplary storage system according to the first embodiment. A storage system 5 illustrated in FIG. 1 is an exemplary storage system according to the first embodiment.

As illustrated in FIG. 1, the storage system 5 has a host apparatus 10, a storage apparatus 20, a storage device 30, and a cache device 40.

The host apparatus 10 is a computer configured to request the storage apparatus 20 to read data stored in the storage device 30, or write data to the storage device 30.

The storage apparatus 20 is connected to the host apparatus 10, the storage device 30, and the cache device 40. In response to a data read request received from the host apparatus 10, the storage apparatus 20 returns the requested data to the host apparatus 10. Additionally, in response to a data write request received from the host apparatus 10, the storage apparatus 20 stores the requested data in the storage device 30.

The storage device 30 is a device having a storage medium such as an HDD or an SSD (Solid State Drive). For instance, a disk array having a plurality of HDDs connected thereto to provide redundancy using the RAID technique is an example of the storage device 30.

The cache device 40, having a nonvolatile memory such as an HDD or an SSD, or a volatile memory such as a DRAM (Dynamic Random Access Memory) as the storage medium, is a device which has a faster data read speed than the storage device 30. The cache device 40 is used by the storage apparatus 20 as a temporary storage area for temporarily storing data read from the storage device 30. Note that the cache device 40 may be integrally formed with the storage apparatus 20.

The storage apparatus 20 has a storage unit 21 and a control unit 22.

The storage unit 21 is a volatile storage such as a RAM (Random Access Memory), or a non-volatile storage such as an HDD or a flash memory. The control unit 22 is a processor such as a CPU (Central Processing Unit) or a DSP (Digital Signal Processor). However, the control unit 22 may also be an electronic circuit such as an ASIC (Application Specific Integrated Circuit) or an FPGA (Field Programmable Gate Array). The control unit 22 executes programs stored in the storage unit 21 or another memory, for example.

The storage unit 21 stores cache information 21a including content information corresponding to data stored in the cache device 40. The content information is, for example, a fingerprint of the data. A hash value is used as the fingerprint, for example.

The hash value may be calculated using a hash function such as, for example, SHA (Secure Hash Algorithm)-1 and MD5 (Message Digest Algorithm 5). SHA-1 outputs a 160-bit hash value. MD5 outputs a 128-bit hash value. In the example of FIG. 1, the hash value of data d is expressed as fp(d).

The storage unit 21 stores location information 21b associating the storage location of data stored in the storage device 30 with the content information relating to the content of the data. The storage location of data is, for example, the address of the logical volume which has been set for the storage device 30.

Upon receiving from the host apparatus 10 a read request RQ specifying a storage location and requesting to read data, the control unit 22 identifies the content information corresponding to the storage location specified in the read request RQ, referring to the location information 21b. The control unit 22 then reads the data from the cache device 40 and returns the data to the host apparatus 10, when the identified content information is included in the cache information 21a, referring to the cache information 21a.

The example of FIG. 1 illustrates a situation in which a data set D1 is stored in storage locations ADR1 and ADR3, respectively, and a data set D2 is stored in a storage location ADR2. Note that the expression "D1@ADR1" in FIG. 1(C) indicates the data set D1 stored in the storage location ADR1. The same goes for "D2@ADR2" and "D1@ADR3". Additionally, in the example of FIG. 1, the data set D1 is cached in the cache device 40. The data set D1 has been cached when previously read from the storage location ADR1.

In such a case, as illustrated in FIG. 1(A), the storage unit 21 has the cache information 21a associating the data set D1 with the content information fp(D1) of the data set D1. In addition, the storage unit 21 has the location information 21b associating the storage location ADR1 with the content information fp(D1), the storage location ADR2 with the content information fp(D2), and the storage location ADR3 with the content information fp(D1), respectively.

Case (1): Upon receiving the read request RQ specifying the location information ADR1 from the host apparatus 10 (FIG. 1(B)(1)), the control unit 22 identifies from the location information 21b the content information fp(D1) corresponding to the storage location ADR1. The control unit 22 then determines whether the content information fp(D1) exists in the cache information 21a. Since the content information fp(D1) is included in the cache information 21a in this example, the control unit 22 reads the data set D1 corresponding to the content information fp(D1) from the cache device 40, and returns a response RP including the data set D1 to the host apparatus 10.

Case (2): Upon receiving the read request RQ specifying the location information ADR2 from the host apparatus 10 (FIG. 1(B)(2)), the control unit 22 identifies from the location information 21b the content information fp(D2) corresponding to the storage location ADR2. The control unit 22 then determines whether the content information fp(D2) exists in the cache information 21a. Since the content information fp(D2) is not included in the cache information 21*a* in this example, the control unit 22 reads the data set D2 from the storage device 30 based on the location information ADR2, and returns the response RP including the data set D2 to the host apparatus 10.

Case (3): Upon receiving the read request RQ specifying the location information ADR3 from the host apparatus 10 (FIG. 1(B)(3)), the control unit 22 identifies from the location information 21*b* the content information fp(D1) corresponding to the storage location ADR3. The control unit 22 then determines whether the content information fp(D1) exists in the cache information 21*a*. Since the content information fp(D1) is included in the cache information 21*a* in this example, the control unit 22 reads the data set D1 corresponding to the content information fp(D1) from the cache device 40, and returns the response RP including the data set D1 to the host apparatus 10.

Using the aforementioned cache information 21*a* and the location information 21*b* allows the control unit 22 to respond to the host apparatus 10 using a cached data set in a different storage location but of the same content, as in above case (3) (symbol a of FIG. 1). Therefore, the time from the read request RQ to the response RP is reduced by the reduced time of the reading time, in comparison with the case of reading data from the storage device 30 and responding to the host apparatus 10 (symbol b of FIG. 1). In other words, performance of the storage system 5 improves.

The first embodiment has thus been described above.

2. Second Embodiment

Next, a second embodiment will be described.

(2-1. System)

Figure 2:
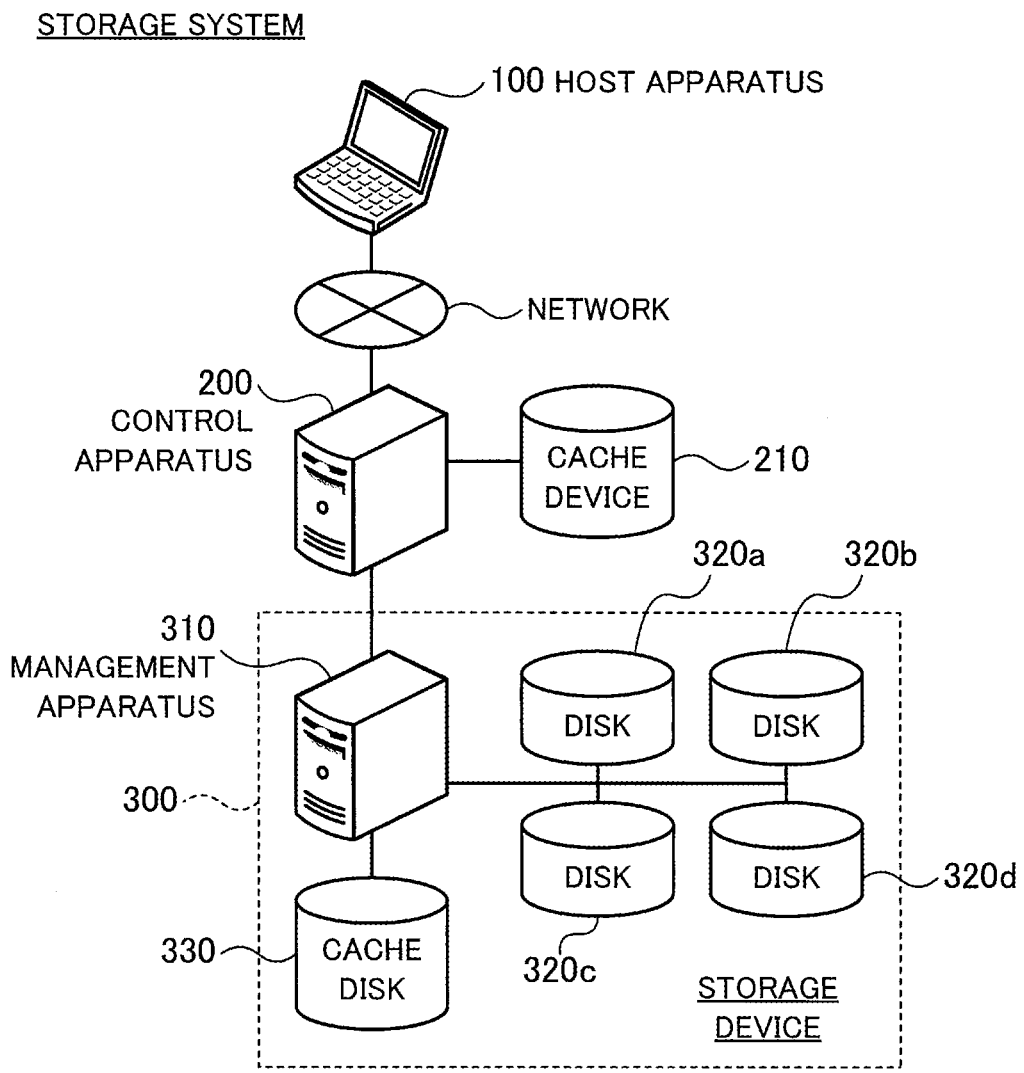
FIG. 2 illustrates an exemplary storage system according to a second embodiment.

A storage system according to the second embodiment will be described. FIG. 2 illustrates an exemplary storage system according to the second embodiment.

As illustrated in FIG. 2, the storage system according to the second embodiment has a host apparatus 100, a control apparatus 200, and a storage device 300.

The host apparatus 100 is connected to the control apparatus 200 via a network. The network is a communication network combining wired or wireless communication lines. The host apparatus 100 is a computer configured to request the control apparatus 200 to read data stored in the storage device 300, or write data to the storage device 300.

The control apparatus 200 is connected to a cache device 210 and the storage device 300. In response to a data read request received from the host apparatus 100, the control apparatus 200 returns the requested data to the host apparatus 100. Additionally, in response to a data write request received from the host apparatus 100, the control apparatus 200 stores the requested data in the storage device 300.

The cache device 210, having a nonvolatile memory such as an HDD or an SSD, or a volatile memory such as a DRAM as the storage medium, is a device which has a faster data read speed than the storage device 300. The cache device 210 is used by the control apparatus 200 as a temporary storage area for temporarily storing data read from the storage device 300. Note that the cache device 210 may be integrally formed with the control apparatus 200.

The storage device 300 has a management apparatus 310, disks 320*a*, 320*b*, 320*c* and 320*d*, and a cache disk 330. The disks 320*a*, 320*b*, 320*c* and 320*d* are storage media such as HDDs or SSDs. In addition, the disks 320*a*, 320*b*, 320*c* and 320*d* are connected to each other. The cache disk 330 is a storage medium (nonvolatile memory such as an HDD or an SSD, or a volatile memory such as a DRAM) having a high-speed access performance.

The management apparatus 310 controls the operation of the disks 320*a*, 320*b*, 320*c* and 320*d* to cause the set of the disks 320*a*, 320*b*, 320*c* and 320*d* to operate as a disk array. In addition, the management apparatus 310 caches the data set read from the disk array in the cache disk 330 and, upon receiving from the control apparatus 200 a read request to the same data set, returns the data set read from the cache disk 330 to the control apparatus 200.

The storage system according to the second embodiment has thus been described above. Although description will be provided in the following considering the storage system illustrated in FIG. 2, for the convenience of explanation, storage systems to which the technique according to the second embodiment may be applied are not limited to the example of FIG. 2. For example, the control apparatus 200 and the host apparatus 100 may be directly connected, or the cache disk 330 may be omitted. Such exemplary variations are within the technical scope of the second embodiment.

(2-2. Hardware)

Figure 3:
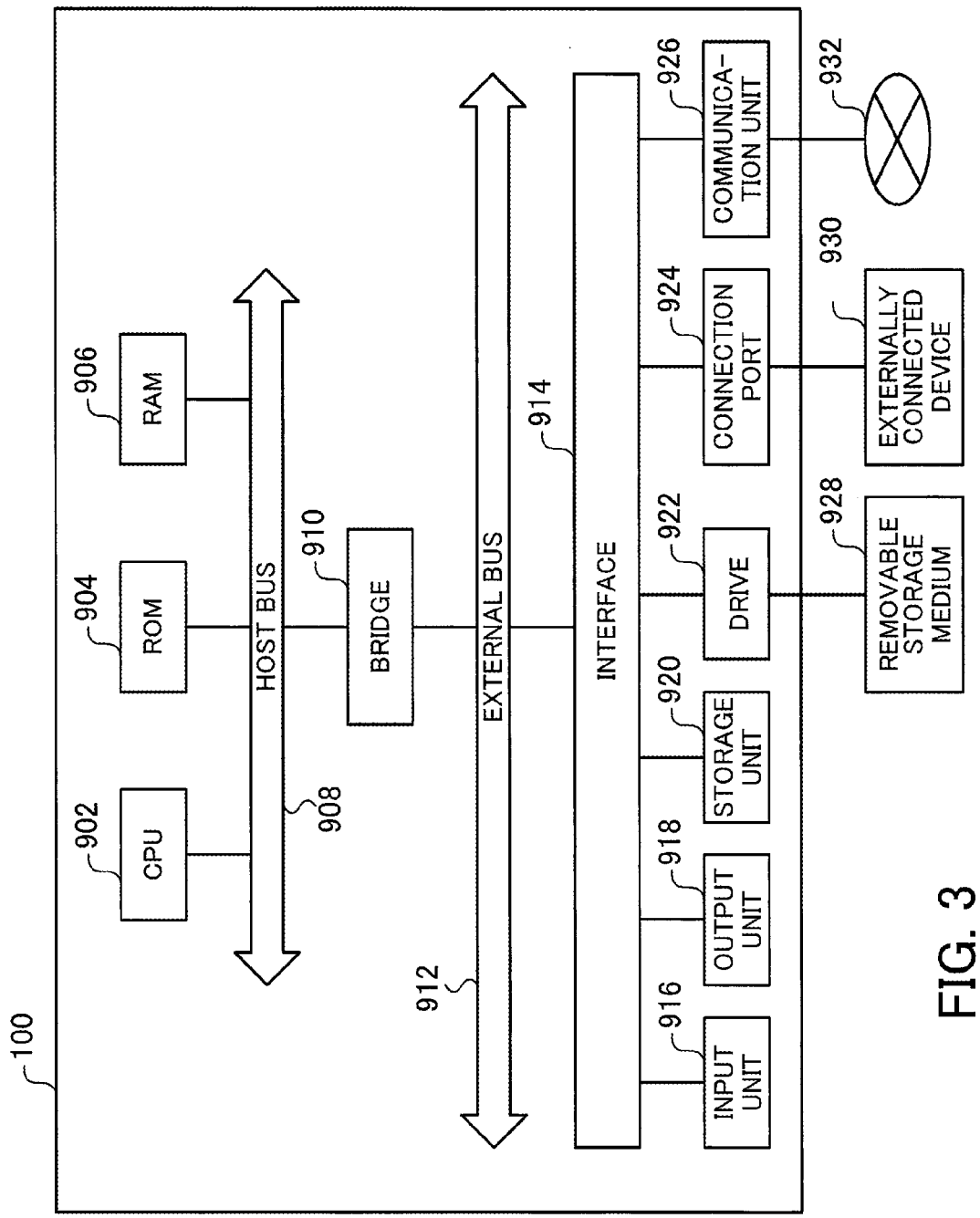
FIG. 3 illustrates an exemplary hardware configuration capable of realizing functions of a host apparatus according to the second embodiment.

Here, a hardware configuration capable of realizing the functions of the host apparatus 100 will be described, referring to FIG. 3. FIG. 3 illustrates exemplary hardware configuration capable of realizing the functions of the host apparatus according to the second embodiment.

The functions provided in the host apparatus 100 may be realized using hardware resources of the information processing apparatus illustrated in FIG. 3, for example. In other words, the functions provided in the host apparatus 100 are realized by controlling the hardware configuration illustrated in FIG. 3 using computer programs.

As illustrated in FIG. 3, the hardware configuration mainly includes: a CPU 902, a ROM (Read Only Memory) 904, a RAM 906, a host bus 908, and a bridge 910. Furthermore, the hardware configuration includes an external bus 912, an interface 914, an input unit 916, an output unit 918, a storage unit 920, a drive 922, a connection port 924, and a communication unit 926.

The CPU 902 functions as an arithmetic processing unit or a control unit, for example, and controls the overall or a part of the operation of each component based on various programs stored in the ROM 904, the RAM 906, the storage unit 920, or a removable storage medium 928. The ROM 904 is an exemplary storage configured to store programs to be read into the CPU 902 or data to be used for calculation. The RAM 906 temporarily stores, for example, programs to be read into the CPU 902, or various parameters which may vary when the programs are executed.

The aforementioned components are connected to each other via the host bus 908 allowing high-speed data transfer, for example. The host bus 908, on the other hand, is connected to the external bus 912 having a comparatively low data transfer speed via the bridge 910, for example. A mouse, a keyboard, a touch panel, a touchpad, a button, a switch, a lever or the like, for example, is used as the input unit 916. Furthermore, a remote controller capable of transmitting control signals using infrared light or other radio waves may also be used as the input unit 916.

A display unit such as, for example, a CRT (Cathode Ray Tube), an LCD (Liquid Crystal Display), a PDP (Plasma Display Panel), or an ELD (Electro-Luminescence Display) is used as the output unit 918. In addition, an audio output device such as a loud speaker or a headphone, a printer, or the like, may be used as the output unit 918. In other words, the output unit 918 is a device capable of outputting information visually or audibly.

The storage unit 920 is a device configured to store various data. For example, a magnetic storage device such as an HDD is used as the storage unit 920. In addition, a semiconductor storage device such as an SSD or a RAM disk, an optical storage apparatus, a magneto-optical storage device, or the like may also be used as the storage unit 920.

The drive 922 is a device configured to read information stored in the removable storage medium 928 which is a removable storage medium, or write information to the removable storage medium 928. For example, a magnetic disk, an optical disk, a magneto-optical disk, a semiconductor memory, or the like, is used as the removable storage medium 928.

The connection port 924 is a port configured to connect an externally connected device 930 such as, for example, a USB (Universal Serial Bus) port, an IEEE 1394 port, a SCSI (Small Computer System Interface), an RS-232C port, or an optical audio terminal. For example, a printer or the like is used as the externally connected device 930.

The communication unit 926 is a communication device for connection to a network 932. For example, a communication circuit for a wired or wireless LAN (Local Area Network), a communication circuit for a WUSB (Wireless USB), a communication circuit or a router for optical communication, a communication circuit or a router for an ADSL (Asymmetric Digital Subscriber Line), a communication circuit for a mobile phone network are used as the communication unit 926. The network 932 connected to the communication unit 926 is a network connected in a wired or wireless manner, including, for example, the Internet, a LAN, a broadcast network, satellite communications circuit, or the like.

The hardware configuration capable of realizing the functions of the host apparatus 100 has thus been described above. The functions provided in the control apparatus 200 and the management apparatus 310 may also be realized using the hardware configuration illustrated in FIG. 3. Therefore, description of the hardware configuration of the control apparatus 200 and the management apparatus 310 will be omitted.

(2-3. Functions)

Next, the functions of the control apparatus 200 will be described, referring to FIGS. 4 to 9.

Figure 4:
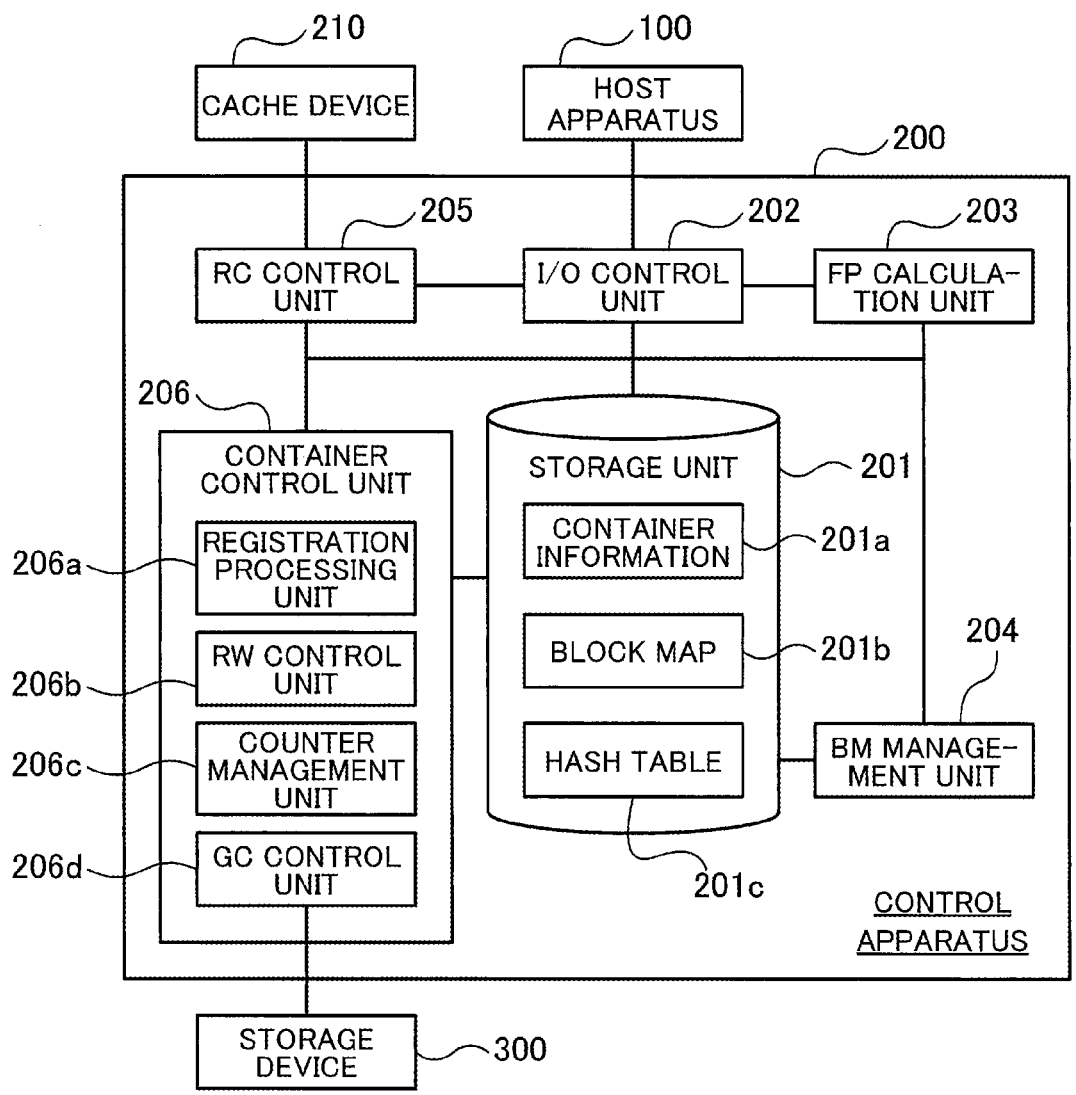
FIG. 4 is a block diagram illustrating exemplary functions provided in a control apparatus according to the second embodiment.

FIG. 4 is a block diagram illustrating exemplary functions provided in the control unit according to the second embodiment.

As illustrated in FIG. 4, the control apparatus 200 has a storage unit 201, an I/O control unit 202, an FP calculation unit 203, a BM management unit 204, an RC control unit 205, and a container control unit 206.

Note that the function of the storage unit 201 may be realized using the RAM 906 or the storage unit 920 described above. The functions of the I/O control unit 202, the FP calculation unit 203, the BM management unit 204, the RC control unit 205, and the container control unit 206 may be realized using the CPU 902 or the like described above.

The storage unit 201 has container information 201a, a block map 201b, and a hash table 201c. Information of these components will be described below.

(Container Information)

First, the container information 201a will be described, referring to FIGS. 5 to 7.

Figure 5:
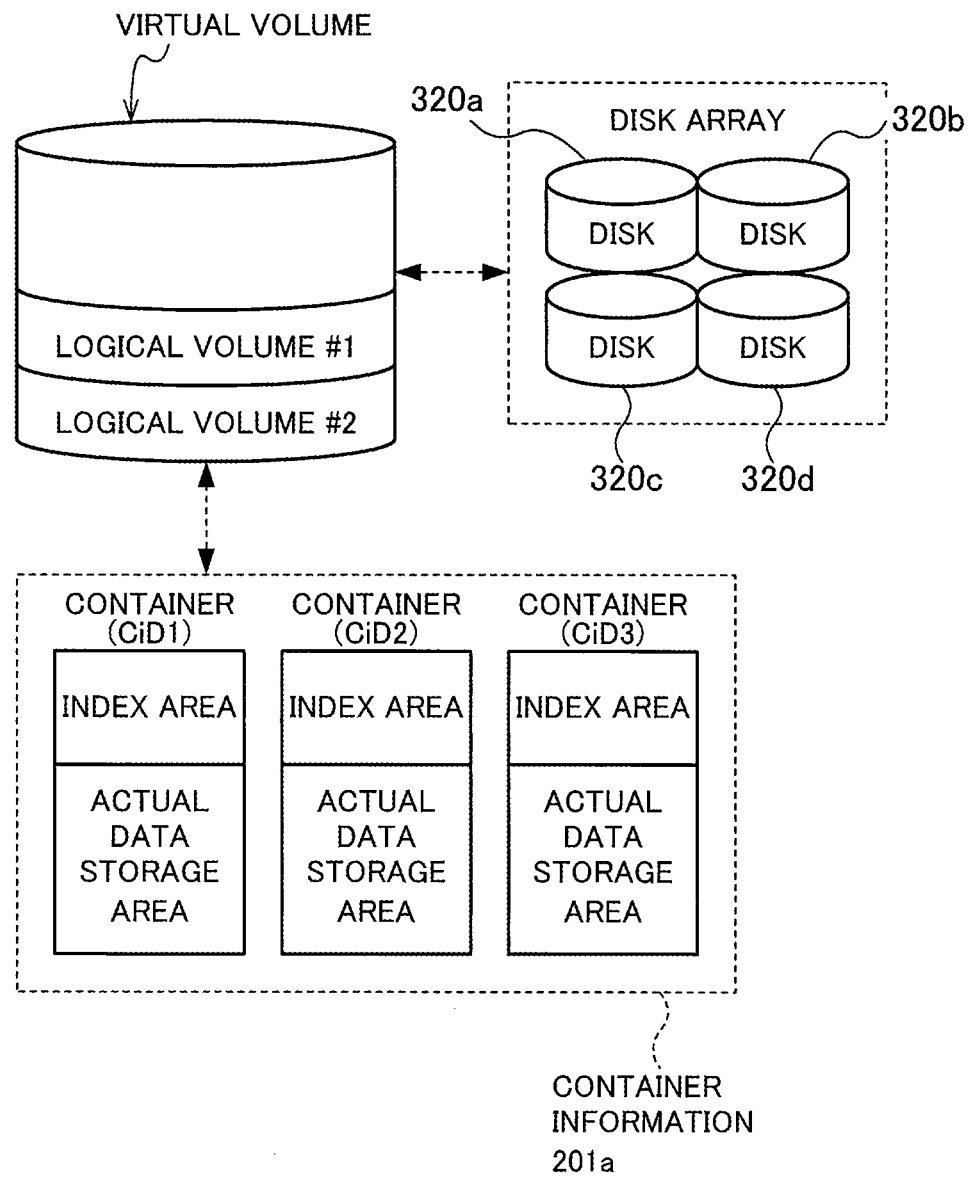
FIG. 5 is a first drawing for explaining container information according to the second embodiment.
Figure 6:
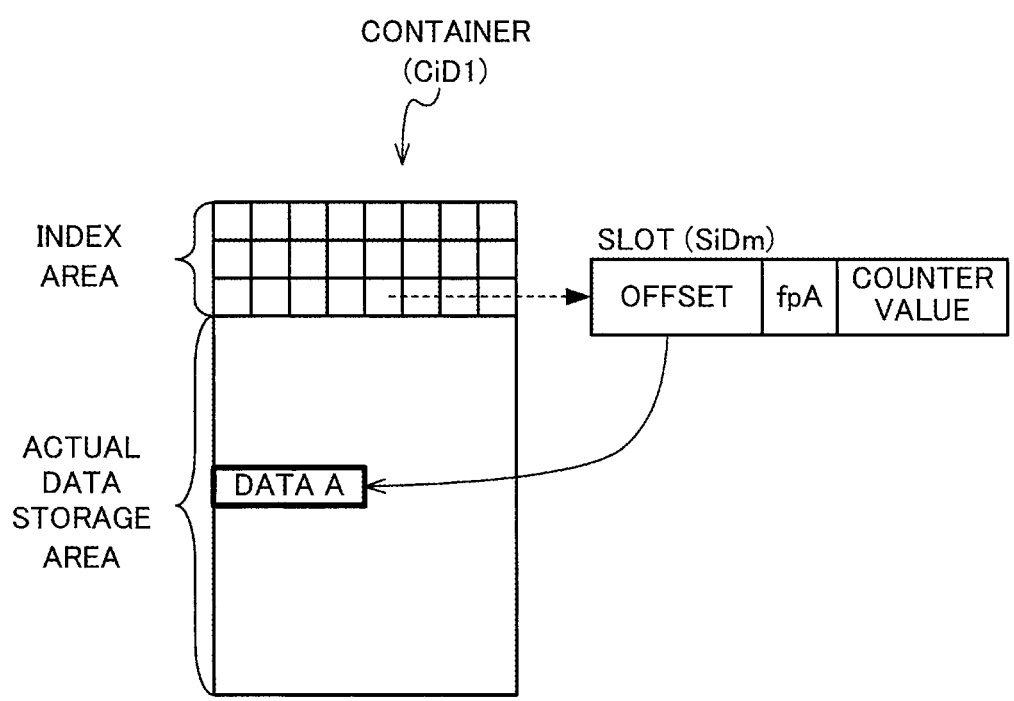
FIG. 6 is a second drawing for explaining container information according to the second embodiment.

FIG. 5 is a first drawing for explaining the container information according to the second embodiment. FIG. 6 is a second drawing for explaining the container information according to the second embodiment. FIG. 7 is a third drawing for explaining the container information according to the second embodiment.

As illustrated in FIG. 5, the control apparatus 200 allocates a virtual storage area (virtual volume) to a storage area on the disk array (physical volume), and controls data read and write processes via the virtual volume. In addition, the control apparatus 200 divides a single virtual volume into a plurality of logical volumes, and manages data in units of logical volume. In the example of FIG. 5, two logical volumes #1 and #2 are set. Note that there is assumed, in the second embodiment, a logical volume which is a target of deduplication.

In addition, the control apparatus 200 sets a logical data storage area (container) which is different from the logical volume, and manages data using the container. Each container is identified using a container ID (CiD). In the example of FIG. 5, three containers CiD1, CiD2 and CiD3 are illustrated.

Each container has an index area and an actual data storage area. The actual data storage area is a storage area for storing data. The actual data storage area may store compressed data. The index area is a storage area for storing information relating to the data stored in the actual data storage area. The index area is divided into a plurality of partial areas (slots), as illustrated in FIG. 6. Each slot is identified using a slot ID (SiD).

Each slot corresponds to an individual data set stored in the actual data storage area. In addition, a slot stores an offset, a fingerprint, and a counter value. The offset indicates the storage location of data in the actual data storage area. The fingerprint is information relating to the content of data stored in the actual data storage area. For example, the fingerprint is a hash value calculated by inputting data to a hash function such as SHA-1 or MD5.

The counter value is an integer value of zero or more. The process of increasing or decreasing the count value will be described below. In the example of FIG. 6, a slot SiDm is associated with a data set A. The offset stored in the slot SiDm indicates the position of the data set A in the actual data storage area. The fingerprint fpA stored in the slot is a hash value of the data set A. In addition, the counter value stored in the slot is information relating to the frequency of writing the data set A.

The container information 201a includes information relating to the container as described above. In addition, the container information 201a includes an FP table as illustrated in FIG. 7. The FP table is information for associating the fingerprint (fp) with a CiD. For example, when a fingerprint fpA of the data set A is included in the container of CiD1 illustrated in FIG. 6, the FP table has information for associating fpA with CiD1 as illustrated in FIG. 7.

In the example of FIG. 7, a fingerprint fpB of a data set B and CiD2 are associated with each other, as well as a fingerprint fpC of a data set C and CiD3. Using the FP table makes it possible to identify the storage destination (container of CiD2) of the data set B corresponding to fpB and the storage destination (container of CiD3) of the data set C corresponding to fpC.

The container information 201a has thus been described above.

(Block Map)

Figure 8:
FIG. 8 is an explanatory diagram of a block map according to the second embodiment.
Figure 8:
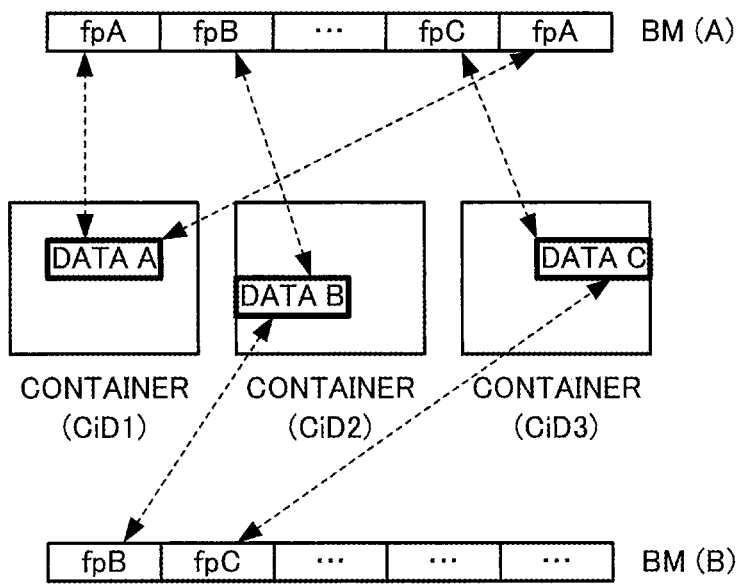

Next, the block map 201b will be described, referring to FIG. 8. FIG. 8 is an explanatory diagram of a block map according to the second embodiment.

As illustrated in FIG. 8, the block map 201b is information for associating a logical volume (LV), an address on a logical volume (LBA: Logical Block Addressing), a fingerprint (fp), and a CiD with each other. The block map 201b has a record associating the LBA, the fp, and the CiD with each other for each LV. Since the fp and a data set are associated with each other, the block map 201b virtually associates the storage location of a data set in an LV with the container having stored the data set therein.

In the block map 201b illustrated in FIG. 8, LBA1 of LV#1 is associated with fpA and CiD1. In other words, the data set A corresponding to fpA is stored in a storage area starting at LBA1 in LV#1, and is also stored in the actual data storage area of the container of CiD1. Additionally, in this example, LBA4 of LV#1 is also associated with fpA and CiD1. This indicates that the data set A is redundantly stored in the storage area starting at LBA4 in LV#1.

The lower part of FIG. 8 schematically illustrates the correspondence relation between data sets on the containers and respective records of the block map 201b. BM (A) indicates a record of the block map 201b with regard to LV#1. BM (B), on the other hand, indicates a record of the block map 201b with regard to LV#2. The data set A of CiD1 corresponds to two fpAs included in BM (A). In other words, duplication of the data set A has occurred in LV#1.

The data set B of CiD2 corresponds to an fpB included in BM (A) and an fpB included in BM (B). In other words, duplication of the data set B has occurred across LV#1 and LV#2. Similarly, the data set C of CiD3 corresponds to an fpC included in BM (A) and an fpC included in BM (B). In other words, duplication of the data set C has occurred across LV#1 and LV#2. As thus described, it is possible to recognize duplication of data sets by referring to the block map 201b.

The block map 201b has thus been described above.

(Hash Table)

Figure 9:
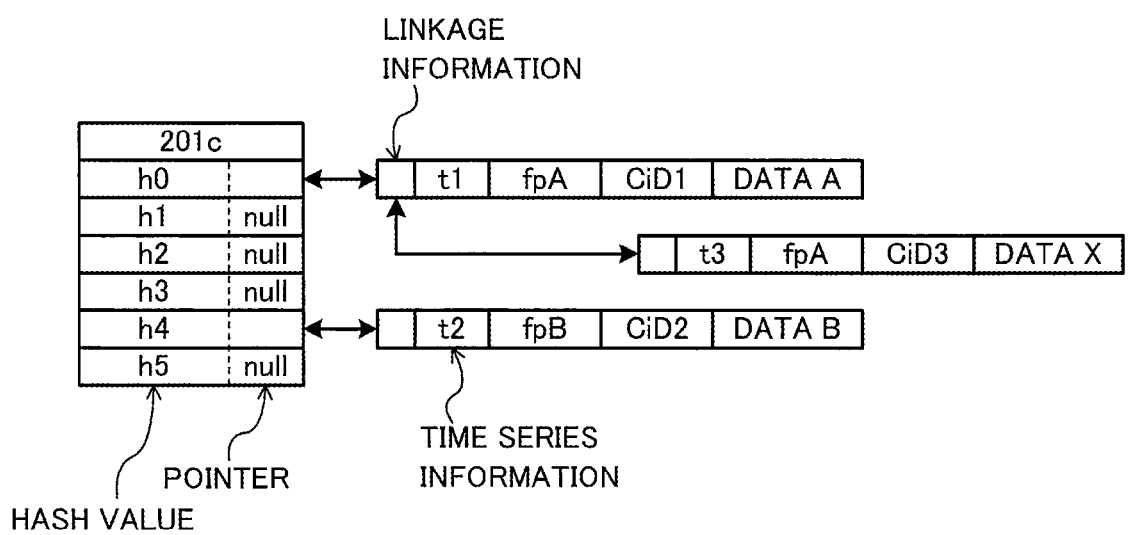
FIG. 9 is an explanatory diagram of a hash table according to the second embodiment.

Next, the hash table 201c will be described, referring to FIG. 9. FIG. 9 is an explanatory diagram of a hash table according to the second embodiment.

The hash table 201c is information for identifying a data set already stored in the cache device 210 (cached data set). For example, the hash table 201c is a table having registered therein a hash value and a pointer.

A hash value is a value calculated by inputting a fingerprint of a data set to a hash function (such as SHA-1 or MD5). In the example of FIG. 9, the hash table 201c has registered therein hash values h0, h1, . . . , h5. A pointer is information for linking these hash values to cached data sets. The record whose pointer field is "null" indicates that no cached data set has been linked thereto.

The hash value to be registered in the hash table 201c is a hash value calculated by inputting a fingerprint of a cached data set to be associated to a hash function (such as SHA-1 or MD5). For example, the hash value h0 associated with the data set A is a hash value h (fpA) calculated by inputting the fingerprint fpA of the data set A to a hash function h. The same goes for the hash value h4.

A cached data set includes linkage information, time series information, a fingerprint, a CiD, and a data main body. The linkage information is information for associating a pointer of the hash table 201c with a cached data set, and also with another cached data set associated with the same hash value. When, for example, the fingerprint of a data set X is the same as the fingerprint of the data set A, the hash value h0 is associated with the cached data set relating to the data set A and the cached data set relating to the data set X.

The time series information is information for determining whether the cached data set is old or new. For example, when the free space is insufficient when storing a new data set in the cache device 210, an older cached data set is deleted based on the time series information and the new data set is cached. In addition, the time series information is updated according to the access frequency or the like. In the following, a set of linkage information may be referred to as a search list, and a set of time series information may be referred to as a time series list.

It becomes possible to search for a cached data set using a hash value by referring to the hash table 201c, the search list, and the time series list. When there exist fingerprints taking the same hash value, it is possible to detect a desired cached data set by performing linear search with the hash value being the first search key and the CiD being the second search key.

Although examples of the hash table 201c and a cached data set for realizing data search by the chaining method are illustrated here, this is not limiting as long as a method of searching for a cached data set is realized with the fingerprint being the search key. For example, the hash table 201c may be a table associating the fingerprint, the CiD, and the address of the cached data set in the cache device 210 with each other.

The hash table 201c has thus been described above.

FIG. 4 will be referred to again.

The I/O control unit 202 controls input and output from and to the host apparatus 100. The FP calculation unit 203 calculates the fingerprint of data to be written to the storage device 300. The BM management unit 204 manages the block map 201b.

The RC control unit 205 manages records of a cached data set stored in the cache device 210 and the hash table 201c. The RC control unit 205 registers the data set in the cache device 210 when reading the data set from the storage device 300. In addition, when reading the data set, the RC control unit 205 updates the records of the cached data set by a method such as LRU (Least Recently Used), or LFU (Least Frequently Used).

The container control unit 206 manages the container information 201a, and controls data read and write processes using the container. The container control unit 206 has a registration processing unit 206a, an RW control unit 206b, a counter management unit 206c, and a GC control unit 206d.

The registration processing unit 206a registers, in a corresponding slot, the fp of a data set stored in the actual data storage area of the container. The RW control unit 206b performs a process of writing data to the container and a process of reading data from the container. In addition, when writing data to the container, the RW control unit 206b registers information in a slot of the index area.

The counter management unit 206c updates the counter value registered in the slot according to the frequency of accessing the data stored in the container. The GC control unit 206d performs a process referred to as garbage collection (GC). GC is a process of migrating, to a new container, all the data sets whose counter values satisfy a condition, among the data sets stored in the target container, and deleting the target container after the migration.

The function of the control unit 202 has thus been described above. In the following, the operation of the control unit 202 based on the aforementioned function will be further described, referring to a flowchart.

(2-4. Operation of Control Apparatus)

The operation of the control apparatus 200 will be described.

(Read Process)

Figure 10:
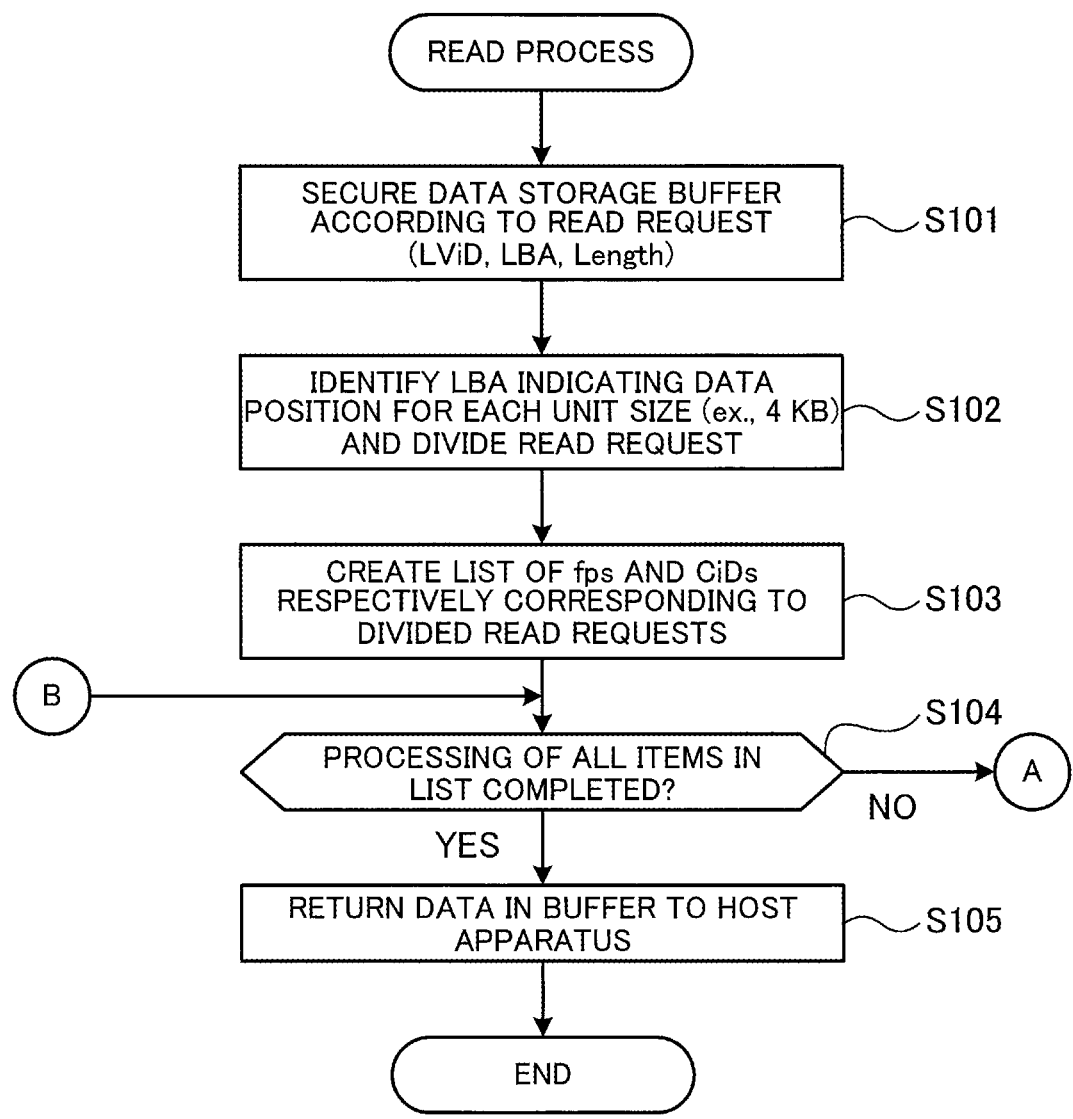
FIG. 10 is a first flowchart illustrating the flow of a read process according to the second embodiment.
Figure 11:
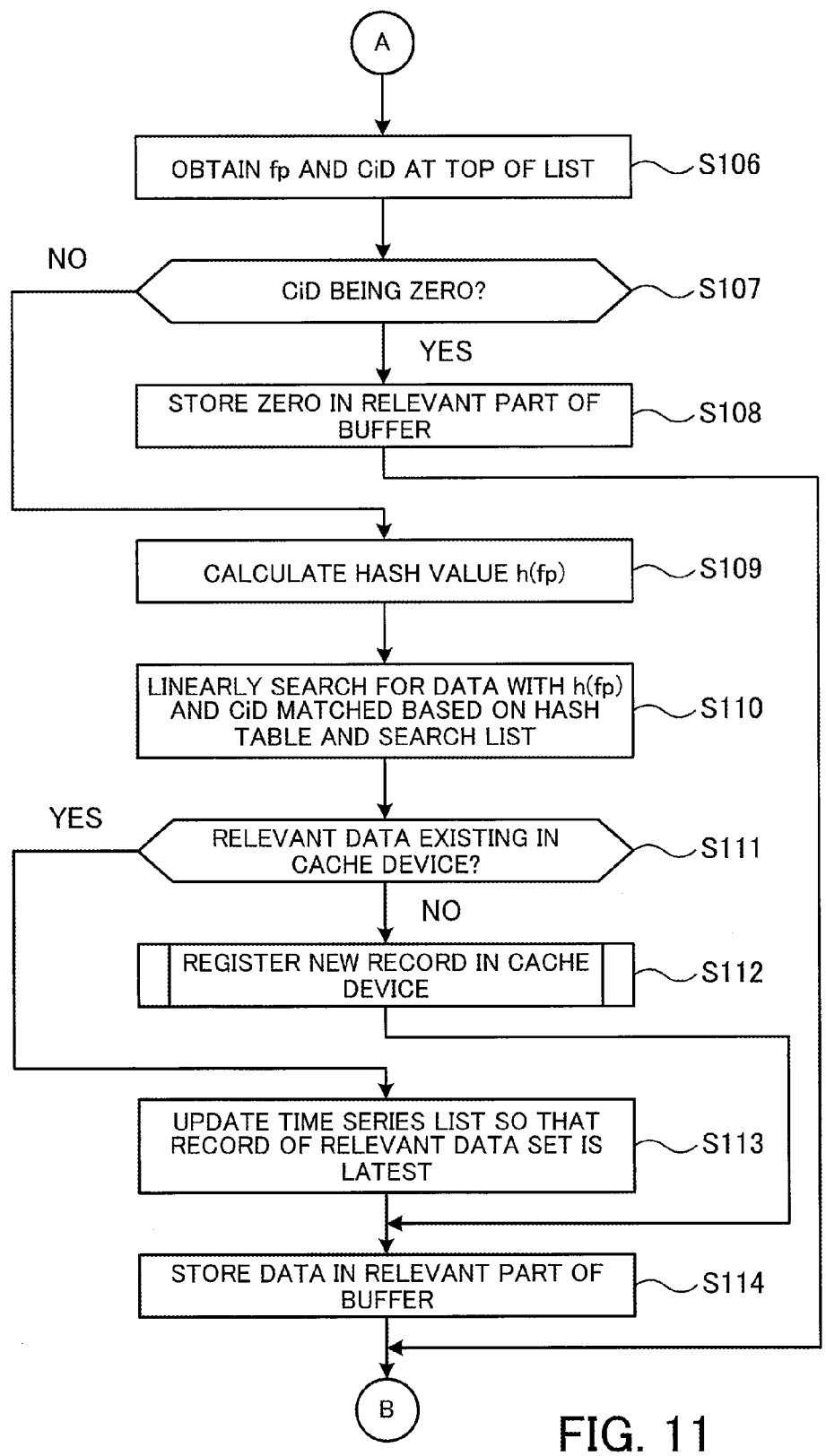
FIG. 11 is a second flowchart illustrating the flow of the read process according to the second embodiment.

First, the flow of the read process performed by the control apparatus 200 will be described, referring to FIGS. 10 and 11. FIG. 10 is a first flowchart illustrating the flow of the read process according to the second embodiment. FIG. 11 is a second flowchart illustrating the flow of the read process according to the second embodiment.

(S101) The I/O control unit 202 receives, from the host apparatus 100, a read request requesting to read data. The read request includes identification information LViD for identifying a logical volume (LV), the start address LBA of a data set in the LV, and a data length Length. The I/O control unit 202 secures a data storage buffer (e.g., storage area of the storage unit 201) according to the received read request.

(S102) The I/O control unit 202 identifies LBAs indicating data positions at intervals of unit size (e.g., KB) which has been preliminarily set, and divides the read request.

Assuming, for example, a read request specifies an LBA indicating the 0-KB position and a Length of 20 KB, the I/O control unit 202 identifies LBAs indicating the 0-KB, 4-KB, 8-KB, 12-KB, and 16-KB positions as the start positions of divided data sets obtained by dividing the data by 4 KB.

In such a case, the I/O control unit 202 sets the LViD of the read request corresponding to the first divided data set as the LViD of the read request received from the host apparatus 100, and sets the LBA to indicate the 0-KB position and Length to be 4 KB. Similarly, the I/O control unit 202 generates read requests corresponding to the other four divided data sets. In other words, the I/O control unit 202 divides the read request received from the host apparatus 100 into read requests corresponding to the five divided data sets.

(S103) The I/O control unit 202 identifies the fp and the CiD corresponding to the LViD and the LBA included in the divided read request, referring to the block map 201*b*. The I/O control unit 202 similarly identifies the fps and the CiDs for all the divided read requests, and creates a list arranging sets of the identified fp and CiD.

(S104) The I/O control unit 202 determines whether or not processing of all the items in the list has been completed. In other words, the I/O control unit 202 determines whether or not the processes at and after S106 illustrated in FIG. 11 have been completed for all the sets of fp and CiD included in the list. When processing of all the items has been completed, the process flow proceeds to S105. When, on the other hand, there exists a yet-to-be-processed item, the process flow proceeds to S106 of FIG. 11.

(S105) The I/O control unit 202 returns the data in the buffer to the host apparatus 100. Upon completion of the process at S105, the series of processing illustrated in FIGS. 10 and 11 is terminated.

(S106) The RC control unit 205 receives an input of a list from the I/O control unit 202, and obtains the fp and the CiD at the top of the list.

(S107) The RC control unit 205 determines whether or not the obtained CiD is zero. Although the CiD does not take zero, the CiD field included in the block map 201*b* is set to zero when the block map 201*b* is initialized. In other words, when no data has been written to the relevant part of the LV, the CiD read from the block map 201*b* turns out to be zero. When the CiD is zero, the process flow proceeds to S108. When, on the other hand, the CiD is not zero, the process flow proceeds to S109.

(S108) The RC control unit 205 stores zero in a relevant part of the buffer secured for writing data corresponding to the fp and the CiD obtained at S106. The RC control unit 205 then deletes the set of fp and CiD from the list (process completed). Upon completion of the process at S108, the process flow proceeds to S104 of FIG. 10.

(S109) The RC control unit 205 calculates the hash value h (fp) of fp obtained at S106. "h ( . . . )" indicates a hash function. "h ( . . . )" is, for example, a hash function such as SHA-1 or MD5.

(S110) The RC control unit 205 searches for a data set whose CiD and h (fp) match, based on the hash table 201*c* and the search list. For example, the RC control unit 205 identifies a hash value that matches h (fp) in the hash table 201*c*, as illustrated in FIG. 9, and identifies a cached data set whose CiD matches based on the corresponding pointer. When a plurality of cached data sets is linked to the same hash value, the RC control unit 205 performs a linear search with the CiD being the search key, referring to the search list (set of linkage information).

(S111) The RC control unit 205 determines whether or not there exists a relevant data set in the cache device 210. In other words, the RC control unit 205 determines whether or not a cached data set corresponding to the set of h (fp) and CiD (relevant data set) has been detected in the process at S110. When there exists a relevant data set, the process flow proceeds to S113. When no relevant data set exists, the process flow proceeds to S112.

(S112) The RW control unit 206*b* of the container control unit 206 reads the relevant data set from the storage device 300 and inputs it to the RC control unit 205. The RC control unit 205 registers, in the cache device 210, a new record of the relevant data set which has been input from the RW control unit 206*b*. The process at S112 will be further explained in the following description.

(S113) The RC control unit 205 updates the time series list (set of time series information) so that the record of the relevant data set is the latest one.

For example, it is assumed that pieces of time series information t1, t2 and t3 respectively corresponding to the data sets A, B and X illustrated in FIG. 9 indicate new records in the order of t1, t2 and t3. When the relevant data set is the data set X, the time series information of the data set X is rewritten to t1, the time series information of the data set A is rewritten to t2, and the time series information of the data set B is rewritten to t3, for example, so that the record of the data set X turns out to be the latest one. Note that it is also conceivable to rewrite the time series information of the data set X to t0 indicating a newer record than the record of t1.

(S114) The RC control unit 205 stores the data set in the relevant part of the buffer.

When there exists a relevant data set in the cache device 210, the RC control unit 205 stores, in the buffer, the relevant data set which has been read from the cache device 210. When, on the other hand, no relevant data set exists in the cache device 210, the RC control unit 205 stores, in the buffer, the relevant data set which has been read from the storage device 300 via the container control unit 206 at S112. The RC control unit 205 then deletes the set of fp and CiD corresponding to the relevant data set from the list (process completed). Upon completion of the process at S114, the process flow proceeds to S104 of FIG. 10.

Figure 12:
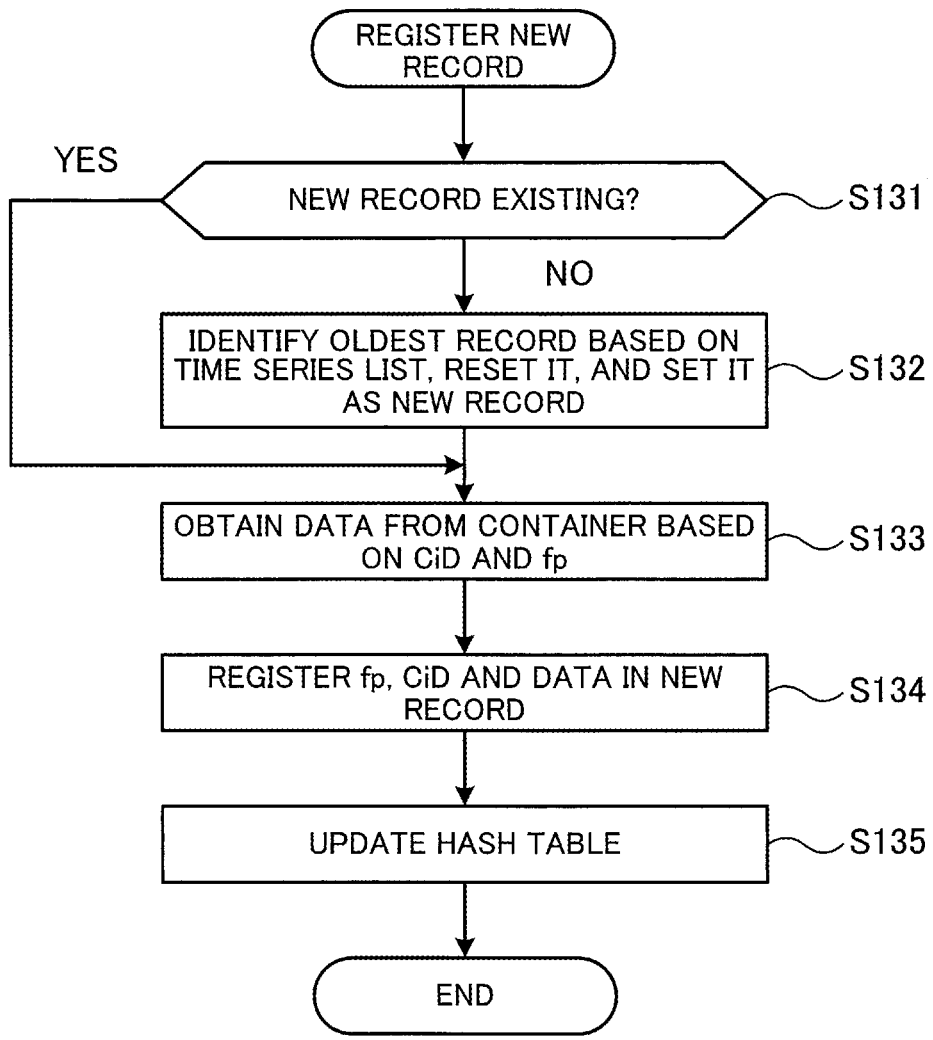
FIG. 12 is a flowchart illustrating the flow of a registration process of a new record according to the second embodiment.

Here, the registration process of a new record to the cache device 210 (S112) will be further described, referring to FIG. 12. FIG. 12 is the flowchart illustrating the flow of the registration process of a new record according to the second embodiment.

(S131) The RC control unit 205 determines whether or not there exists in the cache device 210 an empty record (new record) allowing registration of the relevant data set which has been read from the storage device 300. When there exists a new record, the process flow proceeds to S133. When, on the other hand, no new record exists, the process flow proceeds to S132.

(S132) The RC control unit 205 identifies the oldest record based on the time series list, resets it, and sets it as a new record. In other words, the RC control unit 205 deletes the content registered in the record with the oldest time series information, and resets it so as to allow new registration of information.

(S133) The RC control unit 205 notifies the container control unit 206 of the CiD and the fp of the relevant data set. The RW control unit 206b of the container control unit 206 which has received the notification identifies, based on the container information 201a, a slot including the notified fp, among the slots included in the index area of the container corresponding to the CiD. The RW control unit 206b then obtains the relevant data set from the actual data storage area, based on the offset of the identified slot. The RW control unit 206b inputs the obtained relevant data set to the RC control unit 205.

(S134) The RC control unit 205 registers the relevant data set obtained at S133 in a new record of the cache device 210. On this occasion, the RC control unit 205 registers the fp, the CiD, and the relevant data set in the new record in association with each other.

(S135) The RC control unit 205 updates the hash table 201c. On this occasion, the RC control unit 205 updates the linkage list so that the pointer of the hash table 201c and the new record are linked. In addition, the RC control unit 205 updates the time series list so that the time series information of the new record turns out to be the latest one. Upon completion of the process at S135, the series of processing illustrated in FIG. 12 is terminated.

The flow of the read process performed by the control apparatus 200 has thus been described above.

(Write Process)

Figure 13:
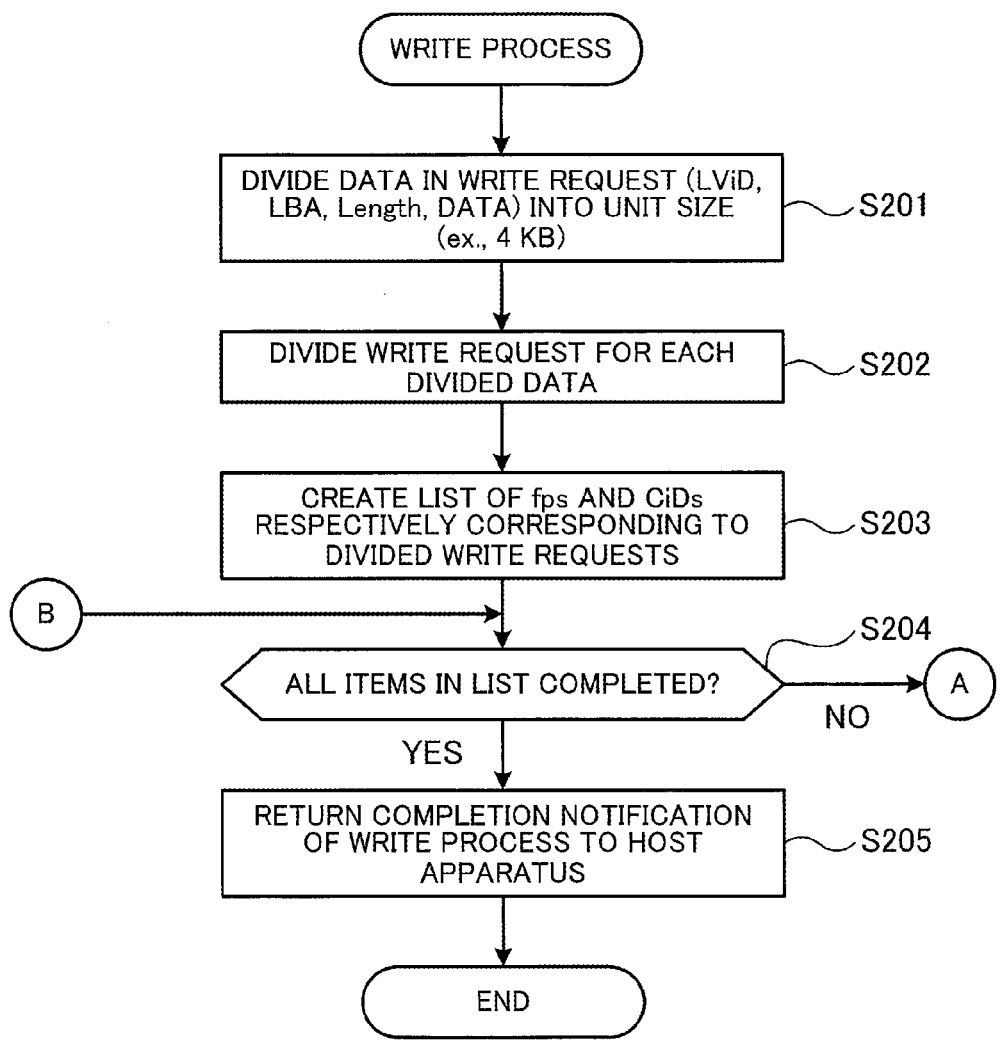
FIG. 13 is a first flowchart illustrating the flow of a write process according to the second embodiment.
Figure 14:
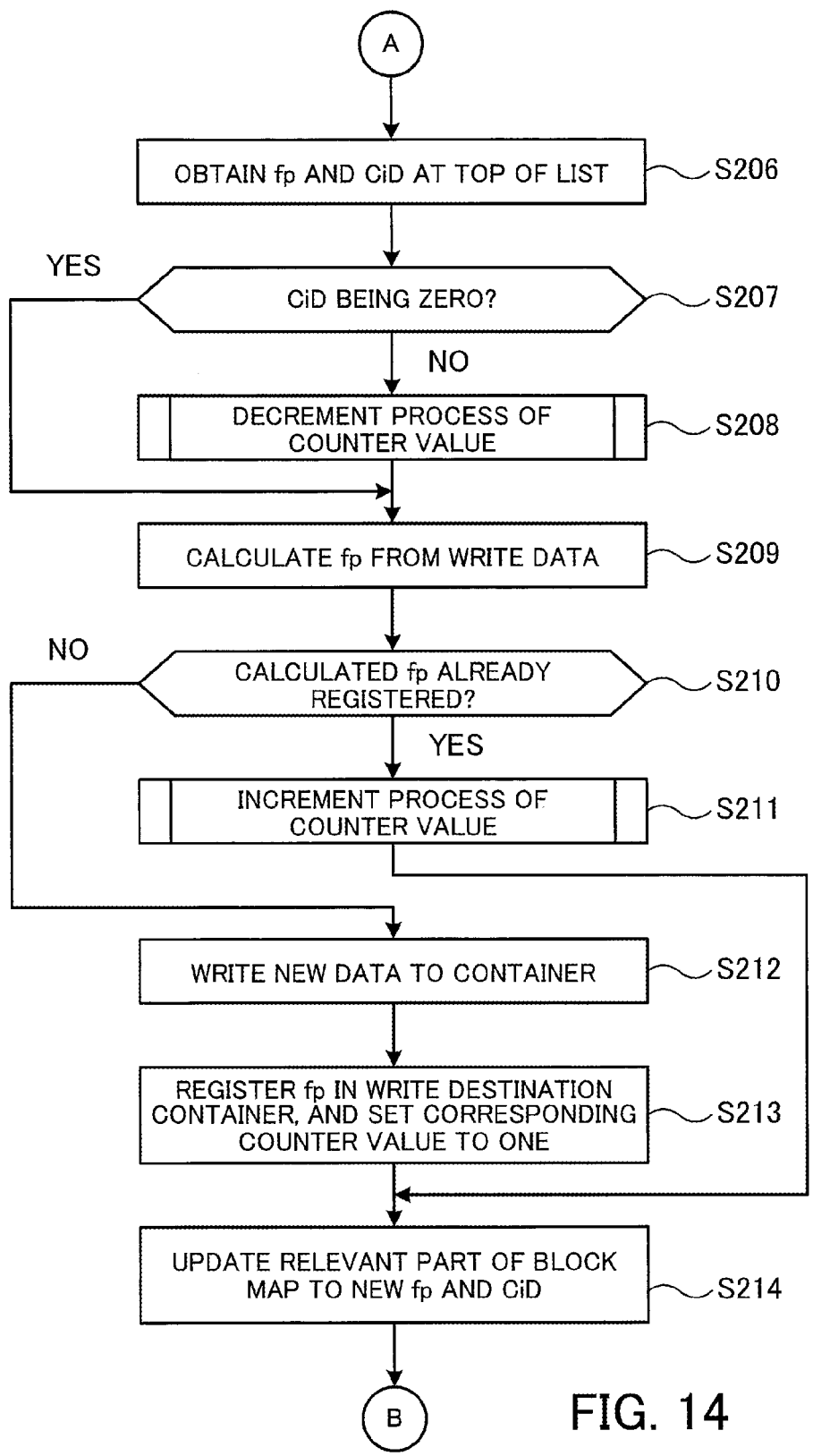
FIG. 14 is a second flowchart illustrating the flow of the write process according to the second embodiment.

Next, the flow of the write process performed by the control apparatus 200 will be described, referring to FIGS. 13 and 14. FIG. 13 is a first flowchart illustrating the flow of the write process according to the second embodiment. FIG. 14 is a second flowchart illustrating the flow of the write process according to the second embodiment.

(S201) The I/O control unit 202 receives, from the host apparatus 100, a write request requesting to write data. The write request includes identification information LViD for identifying a logical volume (LV), a start address LBA of a data set to be written in the LV, a data length Length, and the data set to be written. The I/O control unit 202 divides the data set included in the write request by preliminarily set unit size (e.g., 4 KB).

(S202) The I/O control unit 202 identifies LBAs indicating data positions at intervals of the unit size, and divides the write request.

For example, assuming that a write request specifies an LBA indicating the 0-KB position and a Length of 20 KB, the I/O control unit 202 identifies LBAs indicating the 0-KB, 4-KB, 8-KB, 12-KB, and 16-KB positions as the start positions of divided data sets obtained by dividing the data by 4 KB.

In such a case, the I/O control unit 202 sets the LViD of the write request corresponding to the first divided data set to the LViD of the write request received from the host apparatus 100, and sets the LBA to indicate the 0-KB position and the Length to be 4 KB. The I/O control unit 202 then includes the divided data set in the write request.

Similarly, the I/O control unit 202 generates write requests corresponding to the other four divided data sets. In other words, the I/O control unit 202 divides the write request received from the host apparatus 100 into write requests corresponding to five divided data sets.

(S203) The I/O control unit 202 identifies the fp and the CiD corresponding to the LViD and the LBA included in the divided write request, referring to the block map 201b. The I/O control unit 202 similarly identifies the fps and the CiDs for all the divided write requests, and creates a list arranging sets of the identified fp and CiD.

(S204) The I/O control unit 202 determines whether or not processing of all the items in the list has been completed. In other words, the I/O control unit 202 determines whether or not the processes at and after S206 illustrated in FIG. 14 have been completed for all the sets of fp and CiD included in the list. When processing of all the items has been completed, the process flow proceeds to S205. When, on the other hand, there exists a yet-to-be-processed item, the process flow proceeds to S206 of FIG. 14.

(S205) The I/O control unit 202 returns the data in the buffer to the host apparatus 100. Upon completion of the process at S205, the series of processing illustrated in FIGS. 13 and 14 is terminated.

(S206) The container control unit 206 receives an input of a list from the I/O control unit 202, and obtains the fp and the CiD at the top of the list.

(S207) The container control unit 206 determines whether or not the obtained CiD is zero. Although the CiD does not take zero, the CiD field included in the block map 201b is set to zero when the block map 201b is initialized. In other words, when no data has been written to the relevant part of the LV, the CiD read from the block map 201b turns out to be zero.

When the CiD is zero (that is, when the same data set is not written in the container), the process flow proceeds to S209. When, on the other hand, the CiD is not zero (that is, when the same data set has already been written in the container), the process flow proceeds to S208.

(S208) The counter management unit 206c of the container control unit 206 identifies a slot including the fp obtained at S206, among the slots in the index area of the container corresponding to the CiD obtained at S206. The counter management unit 206c then performs a decrement process on counter values included in the identified slot. The decrement process will be further explained in the following description.

(S209) The FP calculation unit 203 calculates the fingerprint fp from a data set to be written (write data). For example, the FP calculation unit 203 inputs the write data to a hash function such as SHA-1 or MD5 to calculate the hash value, and inputs the calculated hash value to the container control unit 206 as the fingerprint fp.

(S210) The container control unit 206 determines whether or not the fp calculated at S209 is registered in the container.

When the CiD is zero, the container control unit 206 determines that the fp has not been registered yet. When the CiD is not zero, the container control unit 206 determines whether or not the calculated fp has been registered, referring to the slot of the container corresponding to the CiD. When the calculated fp has been registered in the container, the process flow proceeds to S211. When, on the other hand, the calculated fp has not been registered yet in the container, the process flow proceeds to S212.

(S211) The counter management unit 206c of the container control unit 206 performs an increment process on counter values of the slot having registered therein the same fp as the fp calculated at S209. The increment process will be further explained in the following description. Upon completion of the process at S211, the process flow proceeds to S214.

(S212) The RW control unit 206b of the container control unit 206 writes a new data set (write data) to the actual data storage area of the container having the CiD obtained at S206.

When the CiD obtained at S206 is zero, the RW control unit 206b selects a CiD of a container having free space in the actual data storage area, and writes a new data set to the container of the selected CiD. In addition, the RW control unit 206b selects an empty slot in the index area, and registers the offset indicating the position of the written data set.

(S213) The RW control unit 206b registers the fp in the slot having the offset registered therein at S212. The counter management unit 206c of the container control unit 206 sets one as the counter value of the slot to which the RW control unit 206b has registered the fp.

(S214) The BM management unit 204 updates the relevant part of the block map 201b with the new set of fp (fp calculated at S209) and CiD.

When the fp calculated at S209 has not been registered yet and a new data set has been written to the container, the BM management unit 204 registers the new set of fp and CiD to the part relevant to the set of LViD and LBA in the write request. When, on the other hand, the same fp has been already registered in the container, the BM management unit 204 rewrites, with the new fp, the fp which has been already written in the part relevant to the set of LViD and LBA in the write request. The BM management unit 204 then deletes the top item from the list of fps and CiDs (process completed). Upon completion of the process at S214, the process flow proceeds to S204 of FIG. 13.

Figure 15:
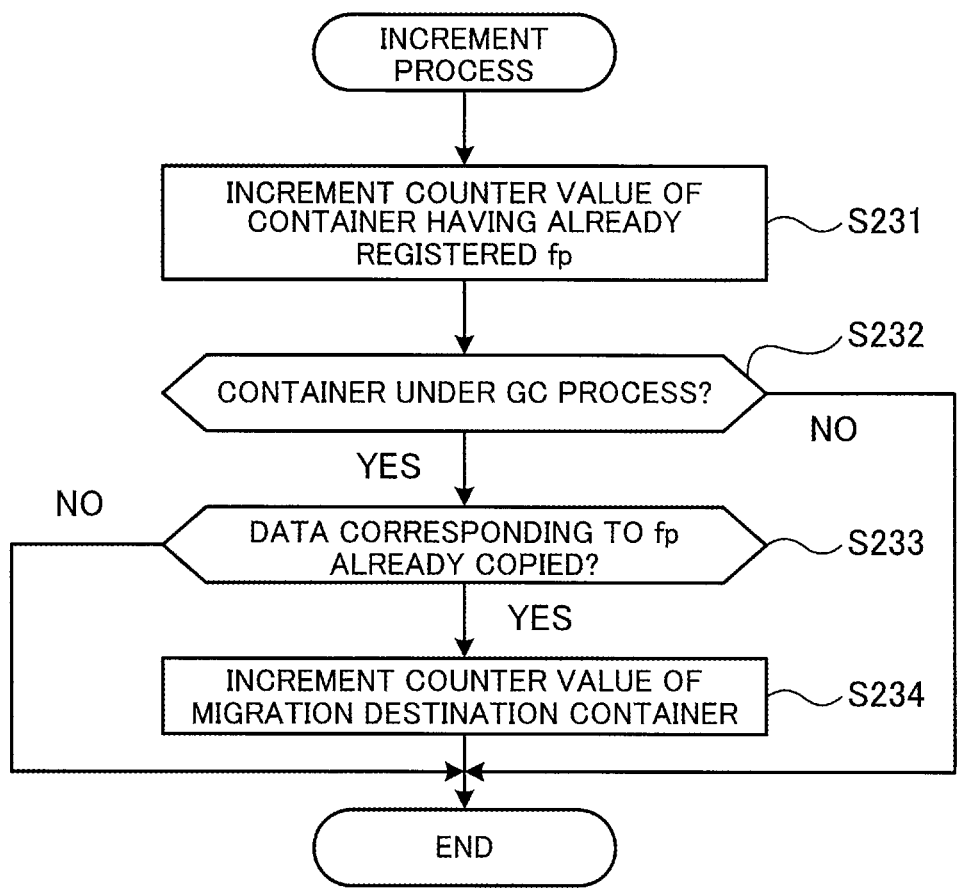
FIG. 15 is a flowchart illustrating the flow of an increment process according to the second embodiment.

Here, the increment process (S211) of the counter will be further described, referring to FIG. 15. FIG. 15 is a flowchart illustrating the flow of the increment process according to the second embodiment.

(S231) The counter management unit 206c increments the counter value of the container having an already registered fp. In other words, the counter management unit 206c identifies the slot having registered therein the same fp as the fp calculated at S209, and increments the counter value included in the identified slot by one.

(S232) The counter management unit 206c determines whether or not the container whose counter value has been incremented at S231 is being subjected to the GC process. In other words, the counter management unit 206c notifies the GC control unit 206d of the CiD of the container, and checks whether or not a data set in the container is being migrated to another container. When the GC process is not being performed, the series of processing illustrated in FIG. 15 is terminated. When the GC process is being performed, the process flow proceeds to S233.

(S233) The counter management unit 206c determines whether the data set corresponding to the fp of the slot with the counter value incremented has been already copied. In other words, the counter management unit 206c notifies the GC control unit 206d of the SiD of the slot, and checks whether the data set indicated by the offset included in the slot of the SiD has been copied to the container of the migration destination. When the copy has been completed, the process flow proceeds to S234. When, on the other hand, the copy has not been completed yet, the series of processing illustrated in FIG. 15 is terminated.

(S234) The counter management unit 206c increments the counter value of the migration destination container to which the data set is migrated by the GC process. In other words, the counter management unit 206c identifies the slot having the same fp included in the index area of the migration destination container, and increments the counter value of the identified slot by one. Upon completion of the process at S234, the series of processing illustrated in FIG. 15 is terminated.

Figure 16:
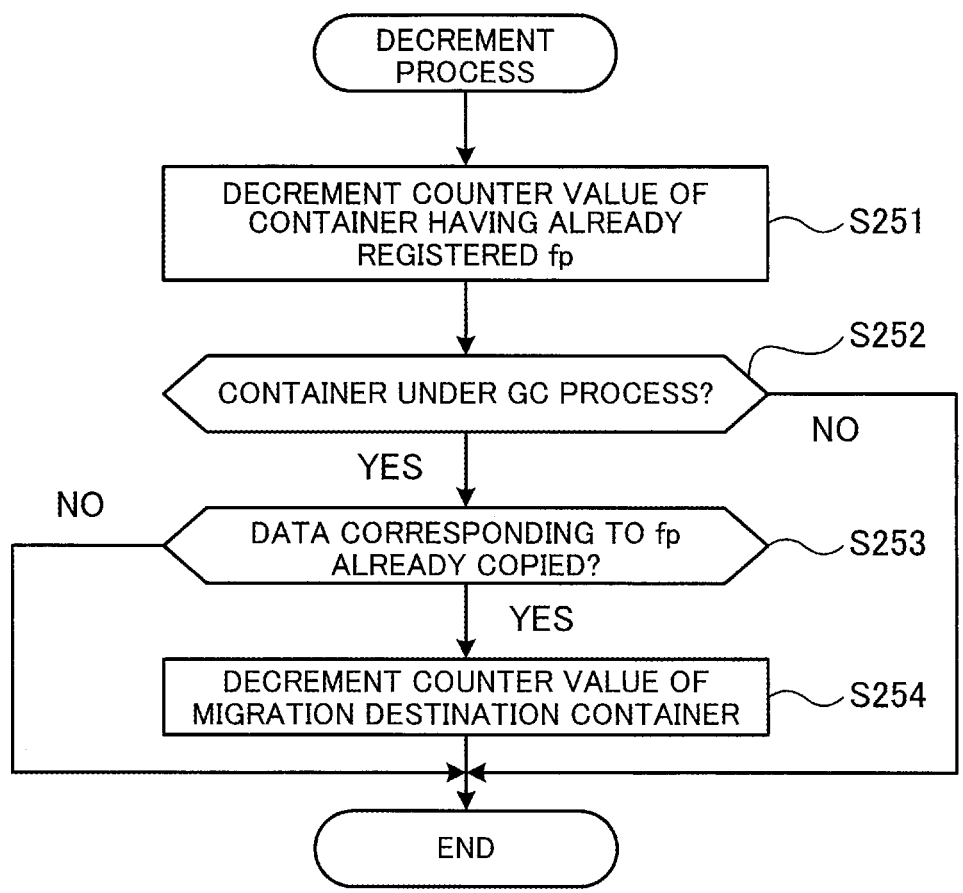
FIG. 16 is a flowchart illustrating the flow of a decrement process according to the second embodiment.

Next, the decrement process (S208) of a counter will be further described, referring to FIG. 16. FIG. 16 is the flowchart illustrating the flow of the decrement process according to the second embodiment.

(S251) The counter management unit 206c decrements the counter value of the container having an already registered fp. In other words, the counter management unit 206c identifies the slot having registered therein the same fp as the fp calculated at S209, and decreases the counter value included in the identified slot by one.

(S252) The counter management unit 206c determines whether the container whose counter value has been decremented at S251 is being subjected to the GC process. In other words, the counter management unit 206c notifies the GC control unit 206d of the CiD of the container, and checks whether a data set of the container is being migrated to another container. When the GC process is not being performed, the series of processing illustrated in FIG. 16 is terminated. When the GC process is being performed, the process flow proceeds to S253.

(S253) The counter management unit 206c determines whether the data set corresponding to the fp of the slot with the counter value decremented has been already copied. In other words, the counter management unit 206c notifies the GC control unit 206d of the SiD of the slot, and checks whether the data set indicated by the offset included in the slot of the SiD has been copied to the container of the migration destination. When the copy has been completed, the process flow proceeds to S254. When, on the other hand, the copy has not been completed yet, the series of processing illustrated in FIG. 16 is terminated.

(S254) The counter management unit 206c decrements the counter value of the migration destination container to which the data set is migrated by the GC process. In other words, the counter management unit 206c identifies the slot having the same fp included in the index area of migration destination container, and decrements the counter value of the identified slot by one. Upon completion of the process at S254, the series of processing illustrated in FIG. 16 is terminated.

The flow of the write process performed by the control apparatus 200 has thus been described above.

(GC Process)

Figure 17:
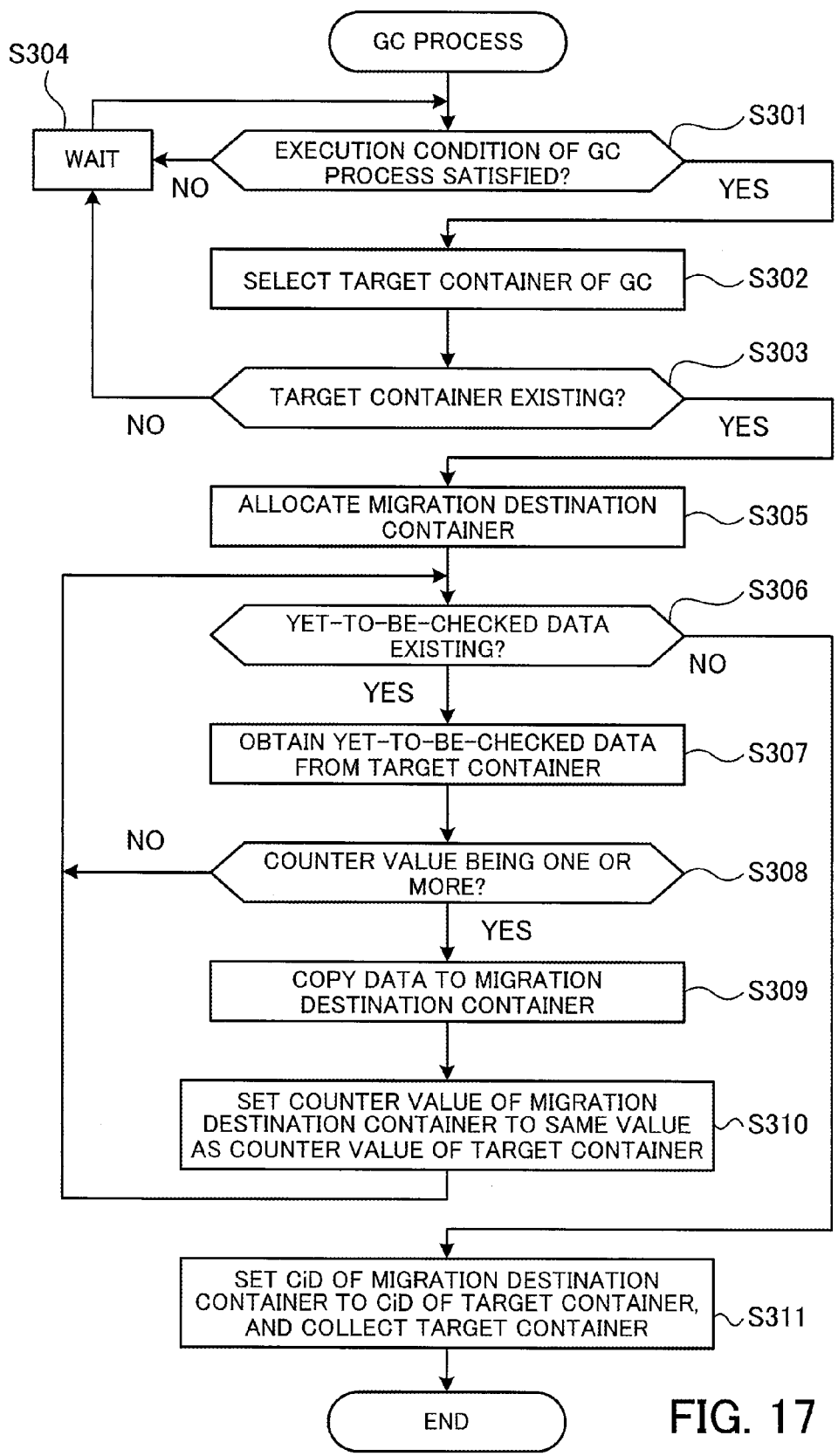
FIG. 17 is a flowchart illustrating the flow of a GC process according to the second embodiment.

Next, the flow of the GC process performed by the control apparatus 200 will be described, referring to FIG. 17. FIG. 17 is a flowchart illustrating the flow of the GC process according to the second embodiment. Note that the process illustrated in FIG. 17 is mainly performed by the GC control unit 206d of the container control unit 206.

(S301) The GC control unit 206d determines whether execution condition of the GC process has been satisfied. The execution condition of the GC process is such that a predetermined time has elapsed since the previous execution of the GC process, for example, or may include items specified by the user. When the execution condition of the GC process has been satisfied, the process flow proceeds to S302. When the execution condition of the GC process has not been satisfied, the process flow proceeds to S304.

(S302) The GC control unit 206d selects a target container of GC. The GC control unit 206d selects a container having a slot whose counter value is zero as a target container, referring to the counter value of each slot within the index area of each container. Note that the GC control unit 206d may select, as the target container, a container whose number of slots with the counter value of zero has exceeded a predetermined ratio of the total number of slots.

(S303) The GC control unit 206d determines whether there exists a target container. When the target container exists, the process flow proceeds to S305. When, on the other hand, no target container exists, the process flow proceeds to S304.

(S304) The GC control unit 206d waits for a preset time without advancing the GC process. After the time has elapsed, the process flow proceeds to S301.

(S305) The GC control unit 206d allocates a newly generated container to a container (migration destination container) to which the data sets stored in the target container are migrated.

(S306) The GC control unit 206d determines whether a yet-to-be-checked data set exists. In other words, the GC control unit 206d determines, for each data set stored in the actual data storage area of the target container, whether all the processes at and after S307 have been completed. When a yet-to-be-checked data set exists, the process flow proceeds to S307. When, on the other hand, no yet-to-be-checked data set exists, the process flow proceeds to S311.

(S307) The GC control unit 206d obtains a yet-to-be-checked data set from the target container.

(S308) The GC control unit 206d determines whether the counter value is one or more, referring to the counter value of the slot corresponding to the data set obtained at S307. When the counter value is one or more, the process flow proceeds to S309. When, on the other hand, the counter value is not more than one, the data set obtained at S307 is regarded as having been checked, and the process flow proceeds to S306.

(S309) The GC control unit 206d copies the data set obtained at S307 to the migration destination container.

(S310) The GC control unit 206d sets the counter value of the migration destination container to the same value as the counter value of the target container. In other words, the GC control unit 206d synchronizes the counter value of the migration destination container with the counter value of the target container for the data set which has been copied at S309. Upon completion of the process at S310, the data set obtained at S307 is regarded as having been checked, and the process flow proceeds to S306.

(S311) The GC control unit 206d sets the CiD of the migration destination container to the CiD of the target container, and collects the target container. In other words, the GC control unit 206d reallocates the CiD from the target container to the migration destination container, and deletes the target container. Upon completion of the process at S311, the series of processing illustrated in FIG. 17 is terminated.

Note that the information of the data set deleted in the GC process is notified to the RC control unit 205. When the data indicated by the information is stored in the cache device 210, the RC control unit 205 deletes the records of the data set from the cache device 210.

The flow of the GC process performed by the control apparatus 200 has thus been described above.

(2-5. Exemplary Variation)

In the foregoing, description has been provided assuming a method which uses the hash value h (fp) of the fp as the first search key and CiD as the second search key when searching for a cached data set. Here, an exemplary variation which uses the SiD as the third search key is suggested, as an expansion of the method.

Figure 18:
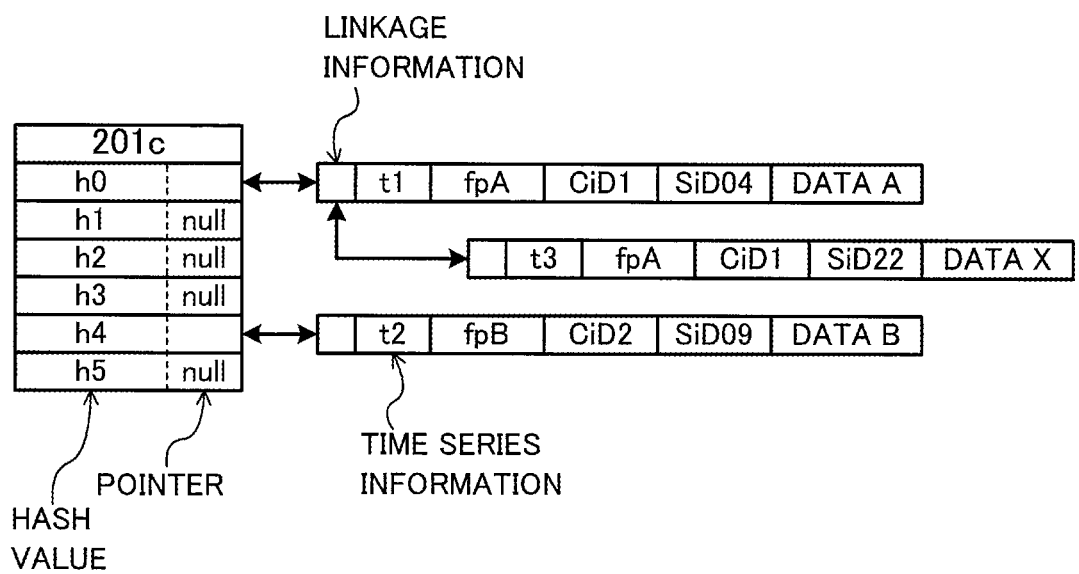
FIG. 18 is an explanatory diagram of cache information according to an exemplary variation of the second embodiment.

FIG. 18 is an explanatory diagram of cache information according to an exemplary variation of the second embodiment. FIG. 19 is an explanatory diagram of a block map according to an exemplary variation of the second embodiment.

When using the SiD as the third search key, records of the cached data set include the SiD in addition to the linkage information, the time series information, the fp, and the CiD, as illustrated in FIG. 18. In addition, the block map 201b includes the LBA, the fp, the CiD, and the SiD corresponding to each LV, as illustrated in FIG. 19. As thus described, transforming the records of the cached data set and the structure of the block map 201b makes it possible to use the SiD as the third search key.

According to the exemplary variation, it becomes possible to uniquely identify a data set using the SiD even when the correspondence relation between the combination of fp and CiD and the data set is not uniquely determined. In other words, even when the data length of fp is short and therefore it is not possible to uniquely identify a data set only by the combination of fp and CiD, it becomes possible to uniquely identify a data set by combining the SiD therewith. This contributes to reduction in the data length of fp and the amount of data to be held, and the like.

The second embodiment has thus been described above.

According to the second embodiment, a cached data set is read via the fp and therefore it becomes possible to read the cached data set and return it to the host apparatus 100 even when the LViD or the LBA is different, provided that a data set having the same content as the data set to be read has been cached. As a result, a faster response is expected, which contributes to the improvement of the performance of the storage system. In addition, data sets having the same content need not be cached, which allows efficient use of the storage capacity of the cache device 210. Furthermore, it is possible to reduce access to the storage device 300, which contributes to increased reliability of the storage system.

According to the embodiment, response speed to a read request increases.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus connected to a storage device that stores data and a cache device used as a temporary storage area of the data, the storage apparatus comprising:
   a memory configured to store
      location information for associating a storage location of data stored in the storage device with a management area to which the data stored in the storage device are assigned and content information relating to content of the data, and
      cache information associating the content information corresponding to data stored in the cache device with the management area to which the data stored in the cache device are assigned; and a processor configured to identify, upon receiving a read request specifying a storage location of data stored in the storage device and requesting to read the data, a pair of the content information and the management area corresponding to the storage location specified in the read request, based on the location information and, when the pair of the content information and the management area is included in the cache information, read the data from the cache device and return the data as a response.

2. The storage apparatus according to claim 1, wherein the management area has a data area to which the data stored in the storage device are assigned and an information area including information of a position in the data area to which the data are assigned, wherein among data stored in one or more logical volumes corresponding to the storage device, data segments of the data having a same content are assigned to a same position in the data area.

3. The storage apparatus according to claim 2, wherein the information area includes a plurality of partial areas including information for managing the storage position in the data area;

the location information associates the storage location of data, the content information corresponding to the data, and the management area and the partial areas corresponding to the data with each other;

the cache information associates the content information corresponding to the data with the management area and the partial areas corresponding to the data; and the processor determines, based on a combination of the content information, the management area and the partial areas, whether or not to read data corresponding to the combination from the cache device and return the data as a response.

4. The storage apparatus according to claim 2, wherein the storage device has a plurality of storage areas set therein, and the processor copies a data set whose frequency of access is larger than a reference value among data sets stored in a first management area among the plurality of management areas to a second management area which is different from the first management area, deletes the first management area, and updates the location information and the cache information.

5. A storage system comprising a storage device that stores data, a cache device used as a temporary storage area of the data, a storage apparatus connected to the storage device and the cache device, and a host apparatus connected to the storage apparatus, wherein the host apparatus transmits, to the storage apparatus, a read request specifying a storage location of data stored in the storage device and requesting to read the data, the cache device temporarily stores the data stored in the storage device, and the storage apparatus
receives the read request from the host apparatus;
obtains, from a memory,
location information for associating a storage location of data stored in the storage device with a management area to which the data stored in the storage device are assigned and content information relating to content of the data, and
cache information associating the content information corresponding to data stored in the cache device with the management area to which the data stored in the cache device are assigned;
identifies a pair of the content information and the management area corresponding to a storage location of data stored in the storage device, based on the location information, the storage location being specified in the read request; and, when the pair of the content information and the management area is included in the cache information, reads the data from the cache device and returns the data to the host apparatus.

6. A data read method in a storage system including a storage device that stores data, a cache device used as a temporary storage area of the data, a storage apparatus connected to the storage device and the cache device, and a host apparatus connected to the storage apparatus, the data read method comprising:

transmitting, by the host apparatus, to the storage apparatus, a read request specifying a storage location of data stored in the storage device and requesting to read the data, and receiving, by the storage apparatus, the read request from the host apparatus;

obtaining, by the storage apparatus, from a memory,
location information for associating a storage location of data stored in the storage device with a management area to which the data stored in the storage device are assigned and content information relating to content of the data, and
cache information associating the content information corresponding to data stored in the cache device with the management area to which the data stored in the cache device are assigned;

identifying, by the storage apparatus, a pair of the content information and the management area corresponding to a storage location of data stored in the storage device, based on the location information, the storage location being specified in the read request; and, when the pair of the content information and the management area is included in the cache information, reading the data from the cache device and returning the data to the host apparatus, by the storage apparatus.

* * * * *